April 12, 1966 — L. O. HEWKO — 3,245,286
PLANETARY TIRE DRIVE
Filed March 30, 1964 — 4 Sheets-Sheet 1

INVENTOR.
Lubomyr O. Hewko
BY
Robert L. Spencer
ATTORNEY

April 12, 1966    L. O. HEWKO    3,245,286
PLANETARY TIRE DRIVE
Filed March 30, 1964    4 Sheets-Sheet 2

INVENTOR.
Lubomyr O. Hewko
BY
Robert L. Spencer
ATTORNEY

April 12, 1966  L. O. HEWKO  3,245,286
PLANETARY TIRE DRIVE

Filed March 30, 1964  4 Sheets-Sheet 3

INVENTOR.
Lubomyr O. Hewko
BY
Robert L. Spencer
ATTORNEY

April 12, 1966     L. O. HEWKO     3,245,286

PLANETARY TIRE DRIVE

Filed March 30, 1964     4 Sheets-Sheet 4

INVENTOR.
Lubomyr O. Hewko
BY
Robert L. Spencer
ATTORNEY

United States Patent Office 3,245,286
Patented Apr. 12, 1966

---

3,245,286
PLANETARY TIRE DRIVE
Lubomyr O. Hewko, Warren, Mich., assignor to General Motors Corporation, Detroit, Mich., a corporation of Delaware
Filed Mar. 30, 1964, Ser. No. 355,654
6 Claims. (Cl. 74—798)

This invention relates to friction drive mechanisms and more particularly to a friction drive mechanism particularly designed for installations wherein noise limitations are critical. The invention is particularly well adapted for use in torpedo or ship drive trains, where extremely quiet power transmission is required.

In present day submarines, surface ships and other naval craft, it is extremely important to have a quiet speed reduction between the prime mover and the ship's propeller to avoid sound detection in naval warfare. Geared type speed reducers are not satisfactory because they generate unavoidable strong noises and torsional pulsations due to intermittent gear tooth action. Solid metallic propeller shafts normally used with such gear speed reducers are excellent sound transmitting media, allowing the gear reducer and prime mover noises to travel down the driveline and to be radiated into the water through the propeller and other submerged parts of the shaft. In order to reduce this transmission of sound and also to accommodate shaft misalignments due to flexing of the ship's hull by ocean waves, ship manufacturers employ extremely large flexible couplings made of soft rubber. Such couplings, in order to have sufficient torque capacity must be very large and heavy and require the ship to be stopped for servicing.

The speed reducer drive herein described is a friction drive having characteristics such that it can simultaneously function as an extremely quiet speed reducer, flexible coupling, momentary torque overload protection device, torsional damper, clutch for connecting and disconnecting the propeller from the prime mover, and as a noise and vibration insulator preventing transmission of prime mover noise from the prime mover through the solid drive line into the water. The principle of the drive involves the use of inflatable rollers in the friction drive configuration. Also of importance is the provision of passage means for permitting circulation of coolant through certain of the friction contact members such as the sun and ring to cool these members during operation of the transmission. An additional important feature is the provision of passages to the inflatable members whereby the inflation pressure of these members may be varied during transmission operation and whereby any one group of inflatable rollers may be deflated without affecting the inflation of other groups of rollers to permit change of any one group of rollers during transmission operation, thereby avoiding the necessity of interrupting power flow to change the inflatable rollers.

These and other features and advantages of this invention will be apparent from the following specification and claims, taken in conjunction with the accompanying drawings, in which:

Figures 1, 2:
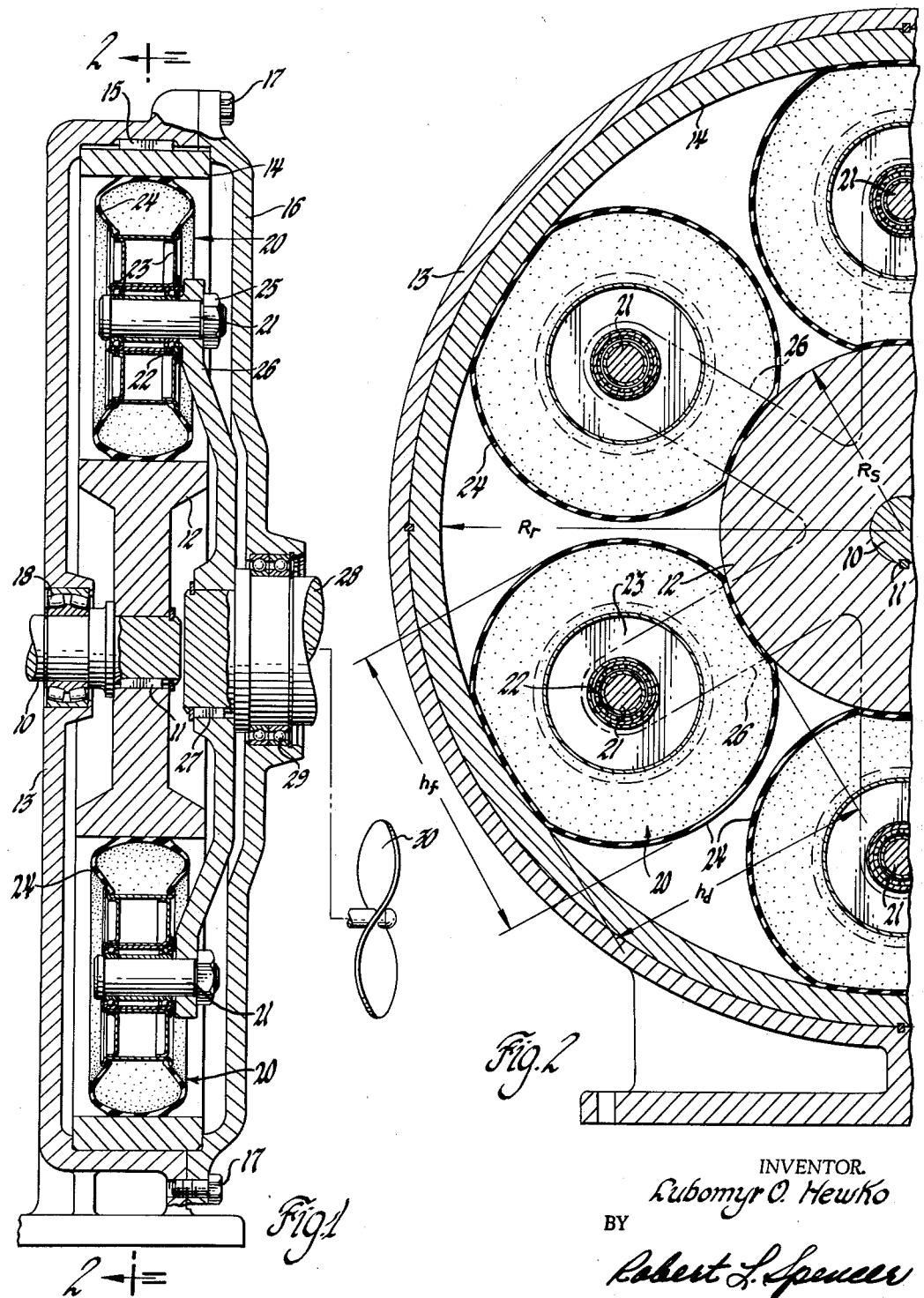
FIGURE 1 is an end sectional view of a friction roller transmission illustrating the basic concept including an inflated roller contact in its assembly.
FIGURE 2 is a sectional view taken along the line 2—2 of FIGURE 1.

Referring to FIGURES 1 and 2, there is shown the basic configuration of the planetary friction drive. A power input shaft 10, driven by a conventional prime mover, not shown, drives an input sun 12, the shaft 10 being keyed to sun 12 by means of a key 11. A fixed housing 13 supports a ring 14 against rotation, the ring 14 being keyed to the housing by a key 15. A removable end cover 16 is secured to housing 13 by bolts 17 to complete the drive enclosure. Input shaft 10 is rotatably supported in housing 13 by means of spherical bearings 18. A planet indicated generally at 20 is rotatably supported on a planet shaft 21 by means of bearings 22. More specifically, planet 20 includes a rim support portion 23 rotatably supported on bearings 22 and an inflatable rolling contact member 24 carried by rim 23 for contacting ring 14. Contact member 24 comprises a resilient tire-like structure, the interior of which is filled with pressurized air or other gas. If desired a spongy elastic material or a liquid may comprise the filler material.

Planet shaft 21 is detachably secured to a planet carrier 26 by means of a nut 25, the carrier 26 being fixed for rotation with a final power delivery shaft 28 by means of a suitable key 27. Shaft 28, which may drive a propeller 30, is rotatably supported in end cap 16 by suitable ball bearings 29.

As best shown in FIGURE 2, the outside radius ($R_s$) of the sun 12 and the inside radius ($R_r$) of ring 14 comprise essentially smooth coaxial cylindrical raceways. The two radii $R_r$ and $R_s$ are chosen such that the difference between them is equal to the planet height in the deflected position or that $(R_r - R_s) = h_d$. The height of the inflatable member or tire 24 in its undeflected position is $h_t$, while $h_t$ is greater than $h_d$. In assembling the unit, the planet is deflated and inserted into the space between the sun 12 and ring 14. Then the planet is inflated with gas or liquid to the desired pressure. This pressure generates a normal load between the planet and sun and planet and ring. This normal load, when multiplied by the coefficient of tire friction constitutes a potential tractive force. Upon application of torque to input shaft 10, the planet 20 will rotate about its axis and will walk around fixed ring 14 to drive final output shaft 28 at reduced speed through carrier 26. Thus, power will be transmitted from sun 12 to carrier 26 through traction of the rolling planet contacts.

The speed ratio of the drive is essentially the same as a similar gear planetary except for a slight increase in speed reduction with increasing torque due to speed loss caused by tangential creep at the rolling contacts.

Thus, the actual speed ratio is:

$$R_{n(actual)} = R_{n(ideal)} \times (1-c) \qquad (1)$$

where $c$ is creep expressed decimally as a fraction of output speed. The ideal ratio is derived from conventional planetary drive formula to be:

$$R_{n(ideal)} = \frac{R_s}{R_s + R_r} \quad (2)$$

Substituting Formula 2 in Formula 1

$$R_{n\ (actual)} = \frac{R_s}{R_s + R_r} \times (1-c)$$

In these formulas, $R_s$ equals the radius of the sun and $R_r$ equals the radius of the ring.

$c$ is primarily dependent on torque transmitted so that the higher the torque the higher the creep $c$ becomes. When the drive is overloaded, the creep increases and reaches a value of $c$ equal 1, the output stops and the tire pinion is in gross slip. This condition is somewhat analogous to tire on an automobile during hard braking with the wheels locked.

In addition to creep losses, torque losses exist in such a drive. These losses consist of rolling resitance and bearing and windage losses. Consequently, speed and torque efficiencies are separate quantities. The product of these two efficiencies is the over-all efficiency. The tire contact can transmit tangential force either in the rolling direction (driving) or in the opposite direction (braking). In a planetary drive as disclosed here, the sun-planet contact performs as a braking contact and the ring-planet contact performs as a driving contact.

Figure 3:
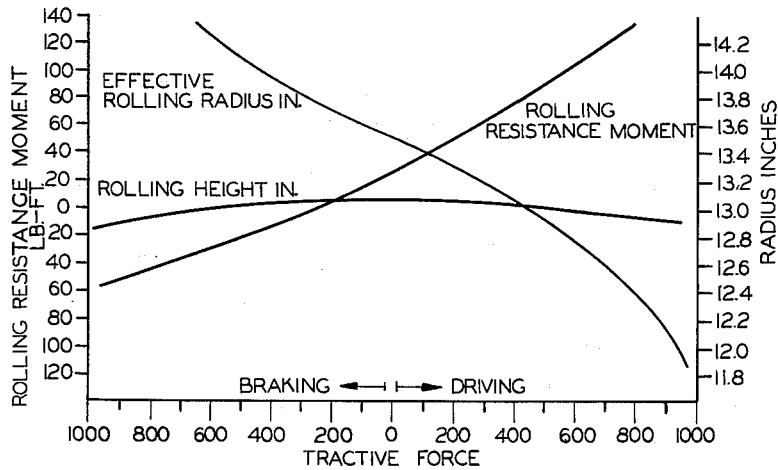
FIGURE 3 is a graph of experimental data wherein a typical automotive tire was used to obtain braking and driving tractive force.
Figure 4:
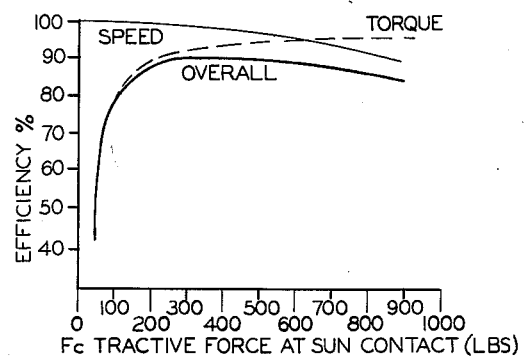
FIGURE 4 is an efficiency curve wherein there is plotted speed and torque efficiencies as separate quantities and the product of these efficiencies, all three curves being plotted as a function of tractive force.

Using experimental data of a typical automotive passenger car tire such as shown in FIGURE 3, it is possible to compute all three efficiencies of a planetary drive. The three efficiencies are plotted in FIGURE 4 as a function of tractive force. For a six planet drive, the input torque of 8000 pounds feet and an output torque of 28,000 pounds feet can be transmitted by the drive shown in FIGURE 1. As shown in FIGURE 4, the over-all efficiency of the drive is quite high. Speed, loads and efficiencies of the tire planetary are limited only by the tire capabilities. Automotive tires used in this example are relatively soft, since they are designed to satisfy ride comfort requirements, and are not designed for maximum load capacity or minimum creep under torque. Certain presently available special tires, particularly aircraft tires for fighter planes are designed to carry very high loads at high speed. Use of tires of such design could double or triple the torque and speed range capabilities of the present drive over that available when using automotive type tires.

If desired, tire cord, tread pattern, and type of rubber used may be modified to improve the speed and torque efficiencies of the drive. It should be noted that since the tires run on smooth raceways along substantially straight paths, tire wear will be very small and tire life will be many times greater than tire life in automobile service.

Figure 5:
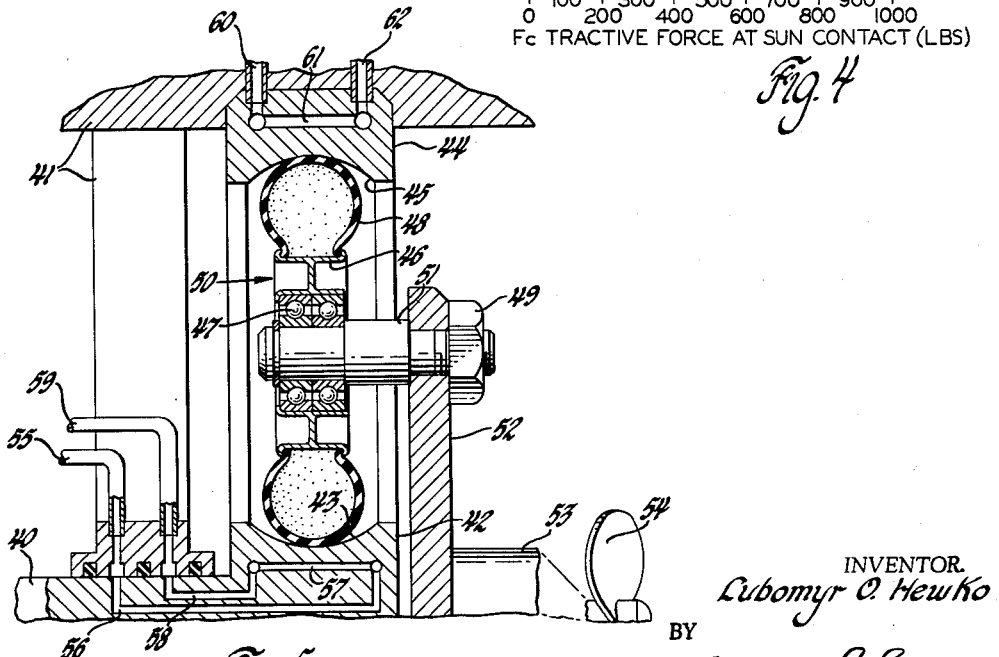
FIGURE 5 is a longitudinal sectional view illustrating sun and ring cooling passages and concave friction contact surfaces on the sun and ring.

In FIGURE 5, there is shown a modification of the design of FIGURES 1 and 2 wherein the friction contact surfaces of the sun and ring are concave rather than cylindrical in shape. In addition, means for cooling the sun and ring is provided. As shown, a power input shaft 40 rotatably supported in a fixed housing 41 drives a sun 42 having a concave friction contact surface 43 formed thereon. A ring 44 is likewise provided with a concave contact surface 45. A planet pinion shaft 51 supported in a planet carrier 52 supports a planet pinion indicated generally at 50. Pinion 50 includes a rim 46 rotatably supported on shaft 51 by means of bearings 47 and an inflatable tire contact member 48 carried by rim 46. Planet shaft 51 is detachably secured to a carrier 52 by means of a nut 49. Carrier 52 drives final power delivery shaft 53 which may drive a ship propeller 54.

Means are provided for circulating coolant through sun 42 and fixed ring 44. A passage 55 in support housing 41 registers with a passage 56 in shaft 40 and a passage 57 in sun 42 connected to passage 56 is connected to a second passage 58 in shaft 40. Passage 58 registers with pasage 59 in housing 41. Passage 55 may be an inlet passage and passage 59 an outlet passage for circulating coolant through sun 42. Additional passages 60, 61 and 62 in housing 41 and ring 44 are provided for circulating coolant through ring 44.

It is to be understood that the contact surfaces of the sun and ring may be of variable cross section contour to help planet guidance and improve contact stress. Also, to improve gripping power or friction contact the surfaces may be serrated, roughened or coated with various materials as desired. Coolant may be circulated through the passages of the sun and ring to cool the contact surfaces, thereby improving durability of the inflated pinion. In most applications, it will suffice to blow air through the coolant passages. However, if desired refrigerant may be circulated through the passages in the sun and ring. With the concave friction surfaces of FIGURE 5, the output shaft 53 may be slightly misaligned and eccentric with respect to input shaft 40 without ill effects, since the rubber planet will deflect and creep sideways a small amount without seriously impairing efficiency or durability. This is an important advantage particularly in the drive of a ship where the vessel body is frequently deflected due to wave action.

Figure 6:
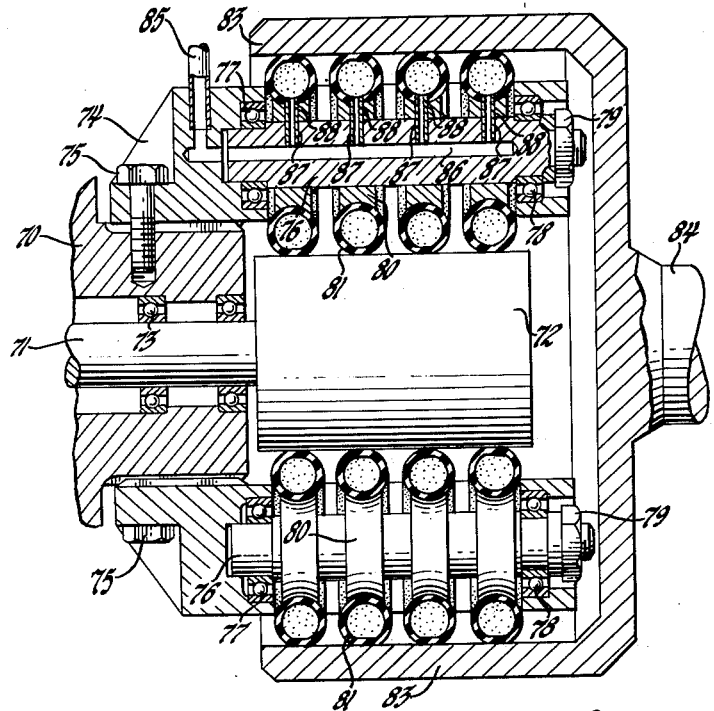
FIGURE 6 is a sectional view of a roller drive arrangement wherein passages are provided whereby the tire pressure may be controlled during transmission operation.

Referring to FIGURE 6, there is shown a drive arrangement incorporating inflatable tires and including several additional useful features.

The drive of this arrangement includes four groups of six tires rather than a single group of six tires as shown in FIGURES 1, 2 and 5. In addition, the tire support is fixed so that each tire rotates only about its own axis of rotation. The design is particularly adapted for servicing while drive is maintained and without stopping the drive.

A fixed housing 70 supports a power input shaft 71 by means of bearings 73, the shaft 71 driving a cylindrical power input member 72. A U-shaped support member 74 is detachably secured to housing 70 by bolts 75. A shaft 76 is supported in member 74 by bearings 77, 78, there being a nut 79 provided for retaining the bearing 78 in the assembly. The inflatable tires 81 are supported on shaft 76 by rims 80 on shaft 76. The tires are in friction contact with member 72, and the inner cylindrical surface of a ring 83. Ring 83 drives a final power delivery shaft 84 which may drive a ship's propeller (not shown). In FIGURE 6, there is further shown means for keeping tire pressure in all of the tires constant by continuously supplying the inflating medium simultaneously to all of the tires. To accomplish this, a fluid pressure inlet passage 85 in carrier 74 is connected to the individual tires through a passage 86 in shaft 76 and by branch passages 87, 88 formed in shaft 76 and the tire rims 80, respectively. Air under pressure may thus be supplied to all of the inflatable tires continuously and simultaneously. An important feature of this arrangement wherein all of the tires of any one group are simultaneously inflatable is that rapid servicing without stopping the drive is made possible. If, due to tire wear or tire failure, it is desired to change one or more of the tires, this can be done simply by reducing power being transmitted, then exhausting the inflating fluid from the tires of one shaft and applying vacuum to the tires of this shaft. Vacuum will collapse the particular set or group of tires so they will cease to contact the ring 83 and member 72. Since the other five tire groups (there being six shafts with four tires on each shaft in total) will still transmit power so that the main power flow is not interrupted. With the particular group of tires deflated, bolts 75 are removed to permit removal of member 74, shaft 76 and the entire assembly of tires 81. A new complement of tires is installed on shaft 76 and the sub-assembly is installed in the drive assembly. As the inflation pressure is increased, the new tires will gradually pick up their share of the torque. This capability for changing the tires without stopping power flow may be a very important feature particularly for naval vessels in warfare. In the FIGURE 6 design, the plurality of tires (four) rotating on each shaft act in parallel to greatly increase the torque transmitting capacity over designs wherein only a single tire is used on each shaft. Since the tires act in parallel, the design of FIGURE 6 will provide four times the torque transmitting capacity of that of FIGURE 1, assuming that each design uses the same number of tire shafts (six). Thus, since the FIGURE 1 design provides 28,000 foot pounds torque transmitting capacity using standard automotive tires, the FIGURE 6 embodiment will provide 112,000 foot pounds capacity. If will be understood that the number of tires used may be varied to meet the torque transmitting requirements to be encountered. A very compact assembly is thereby provided for transmitting large torques.

Figure 7:
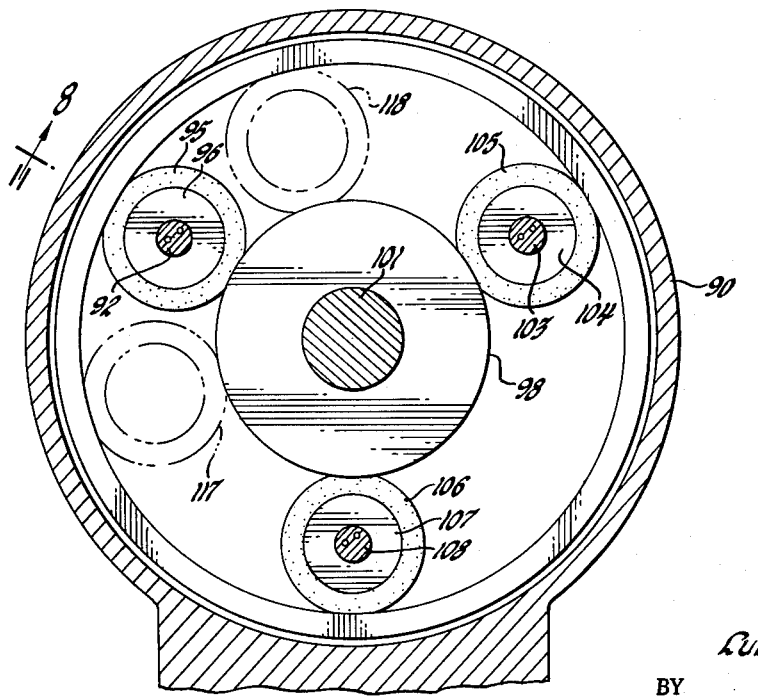
FIGURE 7 is an end view of a roller drive incorporating two power input rollers and an idler roller, wherein the ring is freely rotatable, and wherein the transmission housing has been removed.
Figure 8:
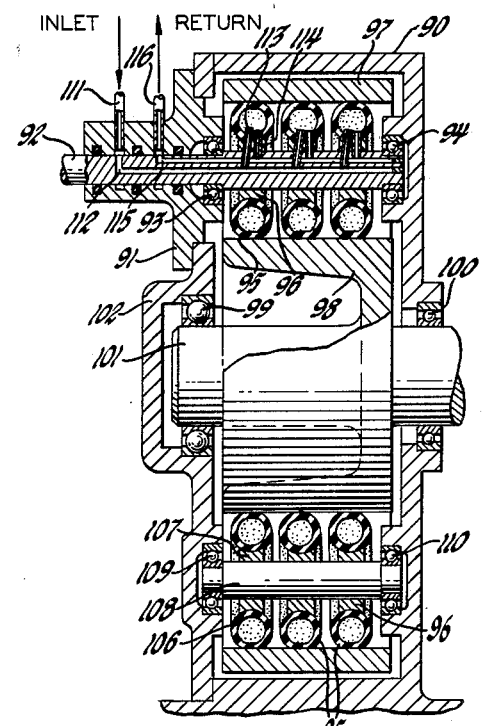
FIGURE 8 is a sectional view taken along the line 8—8 of FIGURE 7, and including the housing and passages for circulating inflation coolant through the individual groups of inflatable tires.

In FIGURES 7 and 8, the drive arrangement is arranged to accommodate two power input shafts and to transmit power to a simple output shaft or vice versa. As best shown in FIGURE 8, a fixed non-rotatable housing 90 has affixed thereto an end cover 91, there being a power input shaft 92 supported for rotation in bearings 93 in cover 91 and bearings 94 in housing 90. A series of inflatable tires 95 supported in rims 96 are driven by input shaft 92 and are in friction contact with a free floating ring 97 and a cylindrical power delivery member 98 fixed to a power delivery shaft 101.

Bearings 99 and 100 supported in an end cover 102 and in housing 90 support shaft 101 for rotation. As best shown in FIGURE 7, two power input shafts 92 and 103 are provided. Shaft 103 drives an inflatable tire 105 mounted on a rim 104 in a manner similar to the drive of tire 95 by shaft 92. A series of idler tires 106 mounted on idler shafts 108 by rims 107 and supported in bearings 109, 110, best seen in FIGURE 8, provide the necessary centering of the ring with respect to the member 98. The drive may have more than two inputs and more than one idler as desired to meet requirements where multiple power tire groups are employed. The tire rims 96 and 104 are rigidly attached to power input shafts 92 and 103 for rotation therewith.

FIGURE 8 further shows means for externally supplying recirculating inflating fluid to all tires in a single group. Cooling and recirculating fluid such as air or refrigerant is admitted to the tires from a suitable source (not shown) through a passage 111 in housing cover 91, passage 112 in shaft 92 and mating passages 113 extending through rim 96. Fluid is conducted out of the inflatable tires by way of passages 114 in rim 96, passage 115 in shaft 92 and passage 116 in housing 91. Cooling and recirculation of this fluid will carry away heat from inside the tires, thus increasing tire durability. Again the tires may be changed without stopping power flow by inserting one or more "dummy" idler tires shown in phantom in FIGURE 7 to insure proper centering forces, collapsing the group of tires to be removed by applying vacuum to it through passages 111, 116 and inserting the new tire complement in place. For instance, if the number 95 group of tires are to be replaced, one or two "dummy" tires 117, 118 could be inserted to temporarily replace that input.

Figure 9:
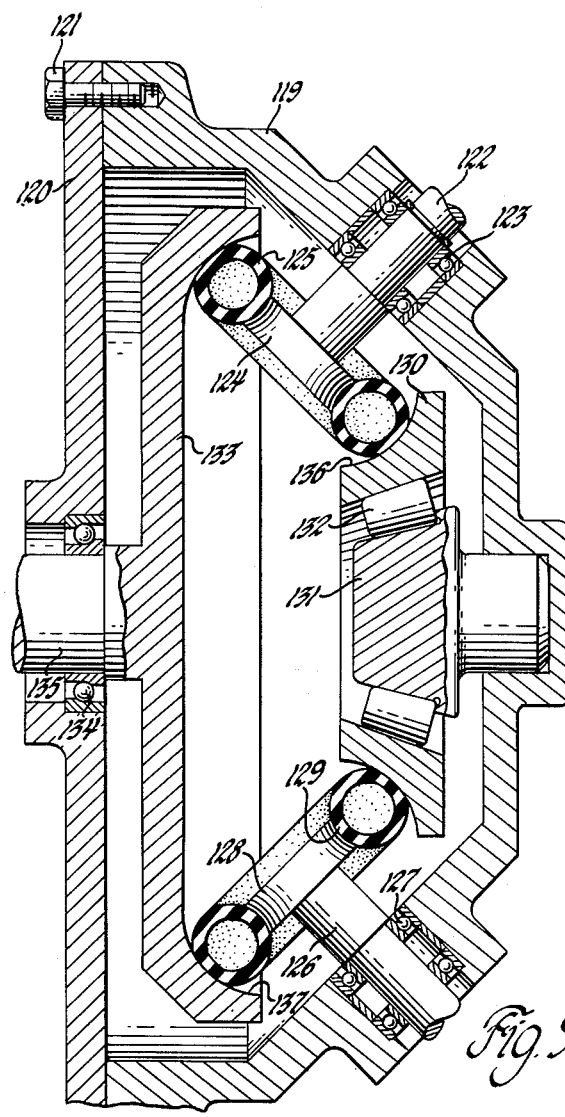
FIGURE 9 is a sectional view of an embodiment including two power inputs and a single output incorporating a freely rotatable idler and wherein extensions of the idler and ring contact surfaces and the axes of the input shafts meet at the centerline of the output shaft.

FIGURE 9 shows a variation of the drive similar to that of FIGURES 7 and 8 wherein the multiple inputs are not only offset, but also inclined with respect to the output. This drive is particularly adapted to installations wherein the prime movers are too large to be accommodated between parallel input shafts. A fixed non-rotatable housing 119 having a detachable cover 120 bolted thereto by bolts 121 supports a pair of power input shafts 122 and 126 therein. Shaft 122, supported in a bearing 123 drives a rim 124 having an inflated tire 125 supported thereon. Similarly, shaft 126 supported in bearing 127 drives a rim 128 carrying an inflated tire 129. An idler member 130 is rotatably supported upon a fixed support 131 carried by housing 119 by means of a bearing 132. A ring 133 supported in a bearing 134 in housing cover 120 is fixed to and drives a power delivery shaft 135. Member 130 and ring 133 are provided with concave rolling surfaces 136 and 137, respectively, adapted to be gripped by the inflated tires 125 and 129, respectively. The concave surfaces of the rolling members 130 and 133 and the centerlines of the shafts 122 and 126 are chosen to intersect at one common point on the centerline of the axis of output shaft 135, thereby providing pure rolling action and improving efficiency. Roller bearing 132 permits the idler member 130 to free-wheel. In FIGURE 9, contra-rotating outputs could easily be provided for by affixing an additional shaft to idler member 130 and extending it through output shaft 135.

As stated, the planetary drives of the various figures having essentially fixed speed ratio may be used either for step up or reduction drive. As shown, reduction drive is obtained, but over-drive may readily be had by reversing the points of power input and output in the respective embodiments.

Among the novel features disclosed is a friction drive using rolling traction of inflatable tires, either in singular or multiple arrangement capable of: coaxial input and output, offset input and output, multiple input and output, inclined (single or multiple) input with respect to output. Raceways may have concave or cylindrical rolling surfaces which may be serrated, roughened, polished or crated to improve traction. Further, means are provided to accommodate freedom for slight misalignment between input and output, torsional damping due to contact creep, quite reduction of speed, a soft coupling and resilient noise barrier in the drive line, and for providing momentary torque overload protection by allowing the tires to slip. In addition, means for changing the tires while transmission or torque continues and without interrupting power flow are provided with or without use of "dummy" tires. Also, declutching of the prime mover from the load by deflating all of the tires and engaging the prime mover to the load can readily be accomplished by deflating and inflating the tires. Means have further been provided for cooling the ring and other tire contacting member to improve tire life, and means is provided for cooling the inside of the tires per se by recirculating gas or liquid to further improve tire life. Again, means is provided for controlling inflation pressure while running in order to vary torsional damping and efficiency characteristics of the drive.

It will be understood that while the coolant passage means in FIGURE 5 is illustrated in both the sun and ring of FIGURE 5, such coolant passage means may be provided either to the sun or ring alone, if desired. It will be further understood in connection with FIGURES 6 through 8, that while the passage means connected to the interior of the tires is illustrated only in connection with one group of tires, each shaft and each group of tires are to be provided with passage means as illustrated. Also, it will be understood that while the tires illustrated in FIGURES 1, 5 and 9 are shown as being inflated in the conventional manner of automobile tires, these tires may be inflated in the manner taught in FIGURES 6 and 8, if desired.

What is claimed is:

1. In a transmission, a power input shaft, a power delivery shaft, means for transmitting power from said input to said output shaft comprising a friction drive train operably connected to said input and output shafts, said drive train including a sun and a ring each having friction contact surfaces, and also including an inflatable flexible rotatable member in friction contact with said surfaces, respectively, and passage means in said sun and ring, respectively, for conducting coolant to and from said sun and ring, respectively for cooling the friction contact surfaces of said sun and ring, respectively.

2. In a transmission, a power input shaft, a power delivery shaft, friction roller mechanism for transmitting torque from said input to said output shaft, said friction roller mechanism including a sun and a ring and an inflatable flexible roller in friction contact with said sun and said ring, first passage means for conducting inflation fluid to the interior of said roller, second passage means for conducting inflation fluid from the interior of said roller, said first and second passage means permitting continuous flow of inflation fluid to and from the interior of said inflatable roller for cooling said roller.

3. In a transmission, a housing, a power input shaft and a power delivery shaft supported for rotation in said housing, a pair of friction contact members, one of said friction contact members being fixed for rotation with said power delivery shaft and the other of said members being freely rotatable, a rim driven by said power input shaft, an inflatable flexible tire supported on said rim in friction contact with said friction contact members, means for continuously circulating inflation fluid through said tire for cooling said tire and for permitting the pressure within said tire to be varied without disrupting the flow of power through said transmission, said means including fluid inlet passage means in said power input shaft and said rif and connected to the interior of said tire and also including fluid discharge passage means in said input shaft and said rim and connected to the interior of said tire.

4. In a transmission, a housing, a power input shaft, a power delivery shaft, a power input member driven by said power input shaft, a power delivery member for driving said power delivery shaft, friction contact surfaces on said power input and power delivery members, respectively, a plurality of idler shafts supported for rotation within said housing, each of said idler shafts having at least one rim fixed thereto for rotation therewith, each of said rims supporting an inflatable tire in contact with friction contact with said contact surfaces, and passage means for conducting inflation fluid to each of said tires respectively, whereby the tires on any one of said idler shafts may be deflated without affecting the inflation of the tires on the remainder of said idler shafts.

5. In a transmission, a housing, a plurality of power input shafts rotatably supported in said housing, a plurality of rotatable idler shafts, a power delivery shaft, a pair of friction contact members, one of said members being freely rotatable and the other of said members being connected to said power delivery shaft for driving the same, a group of rims driven by each of said power input shafts, respectively, a group of rims on said idler shafts respectively, an inflatable tire supported by each of said rims, respectively, and in friction contact with said friction contact members, and passage means in said rims, respectively and said power input and idler shafts, respectively, for conducting inflation fluid to said groups of tires, respectively, said passage means permitting any one group of tires to be deflated without affecting the inflation of any other of the groups of tires, respectively.

6. In a transmission, a power input shaft, a power delivery shaft, means for transmitting power from said input to said output shaft comprising a friction drive train operably connected to said input and output shafts, said drive train including a pair of friction contact means each having a friction contact surface, and also including an inflatable flexible rotatable member in friction contact with said surfaces, and passage means in one of said friction contact means for conducting coolant to and from said one friction contact means for cooling the friction contact surface of said one friction contact means.

References Cited by the Examiner
UNITED STATES PATENTS

| | | | |
|---|---|---|---|
| 584,522 | 6/1897 | Rich | 74—206 |
| 597,311 | 1/1898 | Busch | 74—202 |
| 1,757,476 | 5/1928 | Rennerfelt | 74—798 |
| 2,322,014 | 6/1943 | Grant | 74—204 |
| 3,020,782 | 2/1962 | Sacchi | 74—796 |

FOREIGN PATENTS

| | | |
|---|---|---|
| 9,378 | 1889 | Great Britain. |
| 104,830 | 6/1942 | Sweden. |

DON A. WAITE, *Primary Examiner.*